United States Patent [19]

Suzuki et al.

[11] 4,107,273
[45] Aug. 15, 1978

[54] FLUORESCENT MATERIAL

[75] Inventors: Atsushi Suzuki, Hachioji, Japan; Jean-Pierre Jeser, Esslingen, Fed. Rep. of Germany

[73] Assignee: Hitachi, Ltd., Japan

[21] Appl. No.: 846,535

[22] Filed: Oct. 28, 1977

[30] Foreign Application Priority Data

Nov. 12, 1976 [JP] Japan .................. 51/135333

[51] Int. Cl.$^2$ ............................................ C09K 11/46
[52] U.S. Cl. .................. 423/263; 423/306; 252/301.4 P
[58] Field of Search ............ 252/301.4 P; 423/263, 423/306

[56] References Cited

U.S. PATENT DOCUMENTS

| 3,624,549 | 11/1971 | Geusic et al. ............ 252/301.4 P X |
| 4,000,247 | 12/1976 | Yamada et al. .......... 252/301.4 P X |

OTHER PUBLICATIONS

Buzhinskii et al., "Chemical Abstracts," vol. 83, 1975, 120045d.
"Chemical Abstracts," vol. 84, 1976, 187444x.
Yamada et al., "J. Applied Physics," vol. 45, No. 11, 1974, pp. 5096-5097.

*Primary Examiner*—Jack Cooper
*Attorney, Agent, or Firm*—Craig & Antonelli

[57] ABSTRACT

An infrared rays excited - infrared rays emitting fluorescent material which contains predetermined quantities of neodymium and ytterbium as activators is disclosed.

The fluorescent material according to this invention is higher in the luminescence intensity than a conventional, infrared rays excited - infrared rays emitting fluorescent material which is activated with neodymium only. Moreover, its maximum luminescence wavelength lies within a wavelength region which a silicon photosensor can detect at high sensitivity. It is therefore very useful in practical use.

The fluorescent material is represented by the following formula:

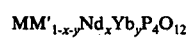

$$MM'_{1-x-y}Nd_xYb_yP_4O_{12}$$

wherein M denotes at least one element selected from the group consisting of Li, Na, K, Rb and Cs, and M' denotes at least one element selected from the group consisting of Sc, Y, La, Ce, Gd, Lu, Ga and In, and where $0.05 \leq x \leq 0.999$, $0.001 \leq y \leq 0.950$, and $x + y \leq 1.0$.

4 Claims, 4 Drawing Figures

FLUORESCENT MATERIAL

BACKGROUND OF THE INVENTION

1. Field of the Invention

This invention relates to a fluorescent material which is excited by infrared rays and which emits infrared rays (such a fluorescent material shall be termed an "infrared - infrared fluorescent material" in the present specification). More particularly, it relates to an infrared - infrared fluorescent material which is higher in the luminescence intensity than conventional infrared - infrared fluorescent materials and the peak of luminescence wavelength of which is well adapted to the responsivity spectrum of a solid-state photosensor.

2. Description of the Prior Art

The infrared - infrared fluorescent material had scanty applications in the past unlike other fluorescent materials, and only a very small number of substances were developed.

Recently, however, the applications of the infrared - infrared fluorescent material have gradually widened for, e.g., the sensors of various analyzers. In consequence, an infrared - infrared fluorescent material exhibiting more excellent characteristics than in the prior art has been desired.

It is stated in the following reference that several substances containing Nd, for example, $CaWO_4$, $Y_3Al_5O_{12}$, $LaF_3$, $CaNb_2O_6$ etc. can be used for solid-state devices for laser oscillation;

(1) "Luminescence of Insulating Solid for Optical Masers," L. G. van Vitert in Luminescence of Inorganic Solids, ed. by Paul Goldberg, p. 465 – 5399, Academic Press 1966.

Any of the above-mentioned substances has been used as the solid-state element for laser oscillation under the state of the single crystal, and there has not been any example in which it is employed as a fluorescent material. It is surely possible to use the substances as infrared - infrared fluorescent materials in the form of fine powder. The compounds which contain Nd ions have the properties that radiation in the infrared wavelength region is intensely absorbed by the Nd ions and that the efficiency of infrared emission is high. However, the concentration of cations to substitute is as low as several %, and the Nd ion concentration per unit volume is not high. Therefore, even if the substances are used as the powdery fluorescent materials, the influence of scattering on the powder surfaces will appear conspicuously, and it will be difficult to obtain a high output.

Recently, several substances for new miniature elements have been reported in the following references:

(2) "Minilasers of Neodymium Compounds," Stephen R. Chinn et al in Laser Focus, May 1976, p. 64 – 69.

(3) "Stoichiometric Laser Materials," H. Danielmeyer in Festkörperproblem XV, p. 253, 1975, Vieh-weg (West Germany).

The substance are the single-crystals of $LiNdP_4O_{12}$, $NdP_5O_{14}$, $Al_3NdB_4O_{12}$ etc. A common feature is that the Nd ion concentration per unit volume is at least one order higher than the concentrations in the compounds mentioned previously. It is accordingly possible to obtain a high luminescence output even in case of the powdery form.

However, the principal emission by the Nd ions lies in the vicinity of 1,050 nm, and this wavelength matches ill with the spectral sensitivity of a silicon photodetector which is the most excellent in the near infrared region. Accordingly, a fluorescent material with which a higher detector output is obtained is requested.

SUMMARY OF THE INVENTION

An object of this invention is to solve the problems of the prior arts and to provide a fluorescent material which has a high luminescence intensity and the luminescence of which can be detected at high sensitivity by a solid-state photosensor.

In order to accomplish the object, this invention adds predetermined quantities of neodymium ions ($Nd^{3+}$) and ytterbium ions ($Yb^{3+}$) as activators, thereby to make the luminescence intensity high and to regulate the emission spectrum into a favorable shape.

DETAILED DESCRIPTION

The infrared - infrared fluorescent material according to this invention contains ytterbium ions ($Yb^{3+}$) together with neodymium ions ($Nd^{3+}$) as an activator, and it is represented by the following general formula:

$$MM'_{1-x-y}Nd_xYb_yP_4O_{12}$$

where M denotes at least one element selected from the group consisting of Li, Na, K, Rb and Cs, M' denotes at least one element selected from the group consisting of Sc, Y, La, Ce, Gd, Lu, Ga, In, Bi and Sb, $0.05 \leq x \leq 0.999$, $0.001 \leq y \leq 0.950$, and $x + y \leq 1.0$.

In the fluorescent material according to this invention, $Nd^{3+}$ acts as an absorbing and emitting ion. That is, it absorbs external exciting light, and it emits light by itself owing to part of the absorbed energy. Simultaneously therewith, it stimulates $Yb^{3+}$ and causes it to emit light owing to the remaining energy. Accordingly, the emission spectrum of the fluorescent material according to this invention has a peak near 980 nm caused by $Yb^{3+}$, and a peak near 1,050 nm caused by $Nd^{3+}$.

Figure 1:
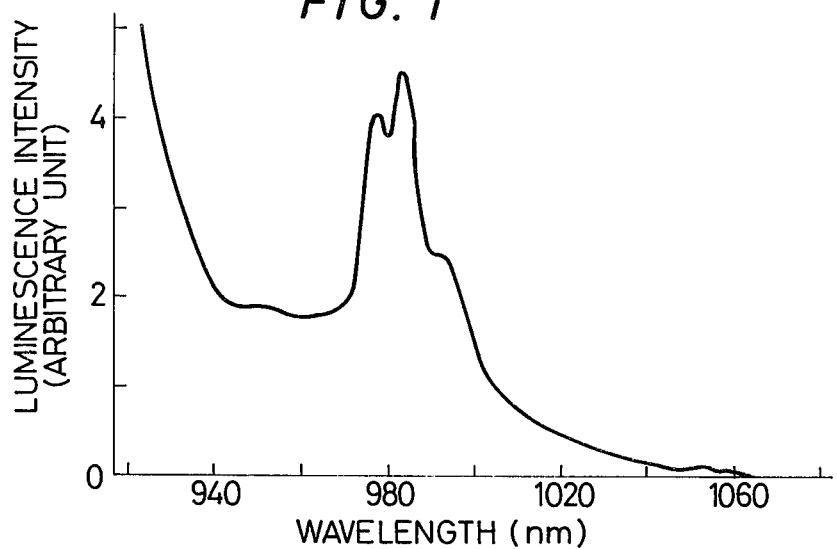
FIG. 1 shows the emission spectrum of $LiNd_{0.9}Yb_{0.1}P_4O_{12}$.

FIG. 1 shows the emission spectrum of $LiNd_{0.9}Yb_{0.1}P_4O_{12}$ which is one of the fluorescent materials according to this invention. This emission spectrum was obtained in such a way that a GaAlAs light emitting diode having an emission peak in the vicinity of 800 nm was employed as an exciting light source and that the intensity of luminescence from the fluorescent material was measured by means of a photomultiplier tube having a photocathode of the S-1 type.

In FIG. 1, luminescence in a region of wavelengths shorter than 940 nm is principally the light emission by the GaAlAs light emitting diode of the exciting light source. Luminescence in the vicinity of 980 nm is the light emission of $Yb^{3+}$ which has had energy transmitted from the excited $Nd^{3+}$. Luminescence in the vicinity of 1,050 nm by $Nd^{3+}$ is feeble.

In case of a prior-art fluorescent material employing only $Nd^{3+}$ as an activator, the luminescence is principally composed of light emissions near 1,050 nm and 900 nm, both of which are light emissions from the $4F_{3/2}$ excited level of $Nd^{3+}$.

The efficiency of the luminescence from this excited level is usually close to 100%. However, the luminescence near 1,050 nm is of only approximately 60% of the energy from the level.

As apparent from FIG. 1, the luminescence near 900 nm overlaps the light emission of the GaAlAs light emitting diode. In order to detect the luminescence from the fluorescent material, therefore, only the luminescence near 1,050 nm which overlaps the exciting light little must be detected by the use of a proper filter. Ultimately, only about 60% of the energy from the excited level is utilized.

On the other hand, in the case of this invention, although the efficiency of transmission of energy from the $4F_{3/2}$ excited level of $Nd^{3+}$ to $Yb^{3+}$ depends upon the concentration of $Yb^{3+}$, the luminescence efficiency of the excited $Yb^{3+}$ is substantially 100%.

More specifically, in the prior-art fluorescent material, the luminescence near 1,050 nm is done by only about 60% of the energy from the $4F_{3/2}$ excited level of $Nd^{3+}$. In the fluorescent material according to this invention, $Yb^{3+}$ is employed as the light emitting ion, whereby part of the energy from the $4F_{3/2}$ excited level is converted into the luminescence at 980 nm, and substantially 60% of the remaining energy is obtained in the form of the luminescence at 1,050 nm. Thus, luminescence at an efficiency higher than in the prior art can be achieved.

Figure 2:
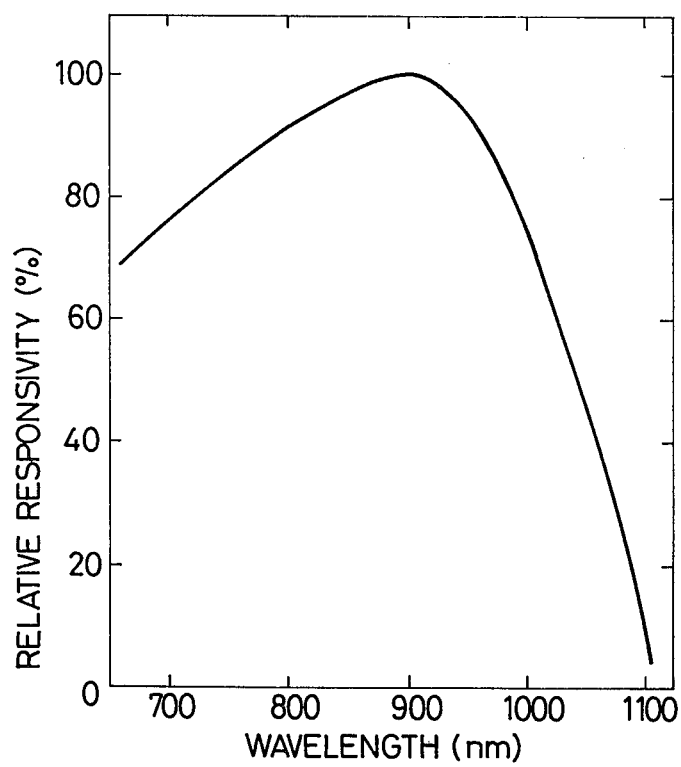
FIG. 2 shows the responsivity curve of a Si-PIN photodetector.

As a detector for detecting the luminescence from the fluorescent material, a solid-state detector device made of Si or the like is of course favorable. The spectral sensitivity of a Si-PIN photodector which is a kind of Si detector is indicated by a curve in FIG. 2, and it has the highest responsivity in the vicinity of 900 nm.

Accordingly, in case where the luminescence by $Nd^{3+}$ (at 1,050 nm) and the luminescence by $Yb^{3+}$ (at 980 nm) are measured with the Si-PIN photodetector, a photoelectric conversion output in which the luminescence by $Yb^{3+}$ is much higher than that by $Nd^{3+}$ is provided even if the luminescence intensities by $Nd^{3+}$ and $Yb^{3+}$ are equal.

The contents of $Nd^{3+}$ and $Yb^{3+}$ in the fluorescent material of this invention need to lie within predetermined ranges, respectively.

Figure 3:
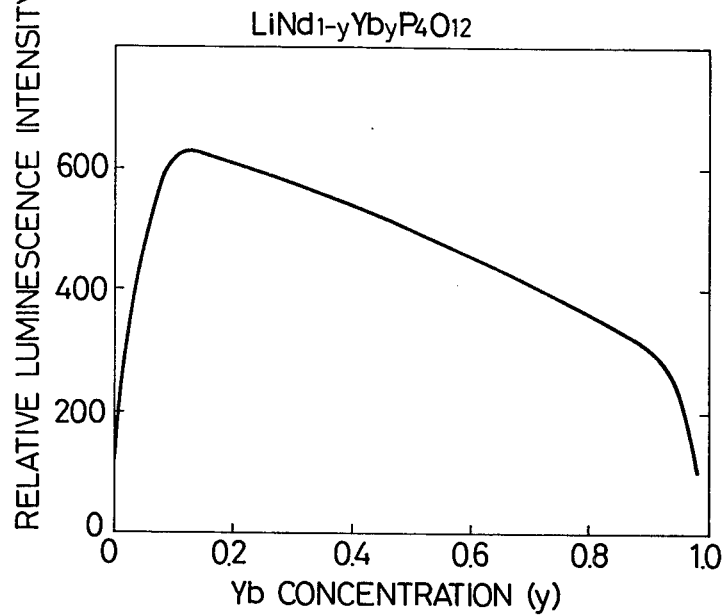
FIG. 3 is a diagram showing the relationship between the luminescence intensity and the Yb content of $LiNd_{1-y}Yb_yP_4O_{12}$.

FIG. 3 represents the luminescence intensities of $LiNd_{1-y}Yb_yP_4O_{12}$ ($O \leq y \leq 0.95$) upon condition that the luminescence intensity of a fluorescent material containing quite no $Yb^{3+}$, i.e., $LiNdP_4O_{12}$ is made 100. Thus, the association of the luminescence intensities with the $Yb^{3+}$ concentrations ($y$) is illustrated.

As apparent from FIG. 3, the luminescence intensity of the fluorescent material according to this invention is higher than in the case of containing no $Yb^{3+}$ when $y$ falls within a range of 0.001 - 0.95. Especially favorable results are obtained when $y$ lies in a range of 0.04 - 0.90. When $y$ is smaller than 0.001 or greater than 0.95, the effect of the addition of $Yb^{3+}$ is scarcely noted, and hence, the range of $y$ needs to be from 0.001 to 0.95.

The characteristic diagram of FIG. 3 was prepared in such a way that a GaAlAs light emitting diode (emission peak wavelength: 800 nm) was employed as an exciting light source and that the luminescences from the fluorescent materials were measured by a Si photodetector through a filter made of polycrystalline InP.

Figure 4:
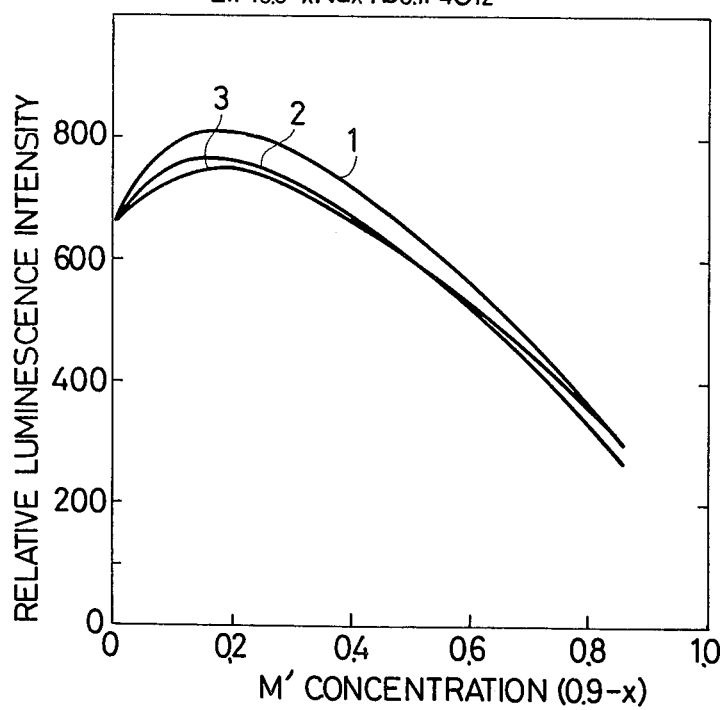
FIG. 4 is a diagram showing the relationship between the luminescence intensity and the M' content of $LiM'_{0.9-x}Nd_xYb_{0.1}P_4O_{12}$.

Even when an ion other than the neodymium ion and the ytterbium ion as can assume trivalence and as exhibits no absorption over wavelengths from 800 nm to 1,000 nm, that is, the ion of at least one element selected from the group consisting of Sc, Y, La, Ce, Gd, Lu, Ga, In, Bi and Sb coexists in the fluorescent material as M' in the aforecited general formula, the fluorescent material produces a higher luminescence intensity as compared with the prior-art fluorescent material activated with only the neodymium ion. By way of examples, FIG. 4 illustrates the relations between the luminescence intensities of fluorescent materials (the outputs of a silicon photodetector) and the contents of M' in a general formula of $LiM'_{0.9-x}Nd_xYb_{0.1}P_4O_{12}$ (the ytterbium ion concentration being fixed to 0.1) upon condition that the luminescence intensity of the prior-art fluorescent material $LiNdP_4O_{12}$ is made 100. In FIG. 4, a curve 1 corresponds to a case of using bismuth as M', a curve 2 corresponds to a case of using yttrium, and a curve 3 corresponds to a case of using cerium. In comparison with the fluorescent material activated with only the neodymium ion, the fluorescent materials according to this invention provide higher outputs in the favorable concentration ranges of neodymium and ytterbium, and a concentration range of 0 - 0.3 is the optimum for the concentrations of the elements.

It has been confirmed that similar effects are obtained when Sc, La, Gd, Lu, Ga, In and Sb other than Bi, Y and Ce are used as M'.

As set forth above, the fluorescent material according to this invention exploits the large absorption cross-section of the neodymium ion in the infrared region and transmits energy from the neodymium ion to the ytterbium ion. Thus, the luminescence of the ytterbium ion which is more adapted to the spectral sensitivity of the conventional silicon photodetector than the luminescence of the prior-art fluorescent material can be attained at high efficiency. As the result, the emission output in the case of employing the silicon photodetector is allowed to sharply increase.

In the above, only the case of exciting the fluorescent material with infrared rays has been described in detail in relation to the enhancement of the luminescence intensity in the fluorescent material of this invention. It is obvious, however, that a higher luminescence intensity than in the prior-art fluorescent material is attained also in case where the energy level of the neodymium ion lying in the visible or ultraviolet wavelength region is excited by an argon laser or the like.

EXAMPLE 1

| Powdery raw materials | | |
|---|---|---|
| $Nd_2O_3$ | 30 | g |
| $Yb_2O_3$ | 4 | g |
| $Li_2CO_3$ | 11 | g |
| $(NH_4)H_2PO_4$ | 140 | g |

The powdery raw materials were mixed well, and were packed into a lidded crucible made of quartz. The crucible was put into an electric furnace, and was heated from the room temperature up to 700° C at a constant temperature-raising rate for 2 hours. Thereafter, the mixture was baked at 700° C for 2 hours. As soon as the baking was completed, the crucible was taken out from the electric furnace and was cooled in the air. A fluorescent material obtained was put into water and was boiled together with the crucible. After cooling, the fluorescent material was cleansed with 1 N-nitric acid, was washed with water and was dried. The fluorescent material synthesized had a composition of $LiNd_{0.9}Yb_{0.1}P_4O_{12}$, and was fine powder having a permeability grain size of about 5 μm. The luminescence intensity of this fluorescent material was approximately 6.5 times as high as that of a fluorescent material activated with only neodymium ($LiNdP_4O_{12}$).

EXAMPLE 2

| Powdery raw materials | | |
|---|---|---|
| $Nd_2O_3$ | 235 | g |
| $Yb_2O_3$ | 40 | g |
| $Bi_2O_3$ | 93 | g |
| $Li_2CO_3$ | 110 | g |
| $(NH_4)H_2PO_4$ | 1380 | g |

The powdery raw materials were mixed well, and were packed into a lidded crucible made of alumina. The crucible was put into an electric furnace, and was heated from the room temperature up to 700° C at a constant temperature-raising rate for 2 hours. Subsequently, the mixture was baked at 700° C for 2 hours. As soon as the baking was finished, the crucible was taken out from the electric furnace and was quickly cooled in the air. A fluorescent material obtained was put into water and was boiled. After cooling, the fluorescent material was cleansed with 1 N-nitric acid, was washed with water and was dried. The fluorescent material synthesized was represented by a composition formula of $LiBi_{0.2}Nd_{0.7}Yb_{0.1}P_4O_{12}$.

This fluorescent material exhibited substantially the same emission spectrum as that in Example 1. The luminescence intensity thereof was approximately 8 times as high as that of the fluorescent material activated with only neodymium ($LiNdP_4O_{12}$).

EXAMPLE 3

| Powdery raw materials | | |
|---|---|---|
| $Nd_2O_3$ | 30 | g |
| $Yb_2O_3$ | 4 | g |
| $Na_2CO_3$ | 16 | g |
| $(NH_4)H_2PO_4$ | 140 | g |

The powdery raw materials were mixed well, and were packed into a lidded crucible made of quartz. The crucible was put into an electric furnace, and was heated from the room temperature up to 740° C at a constant temperature-raising rate (300° C/hour. Thereafter, the mixture was baked at 740° C for 2 hours. As soon as the baking was finished, the crucible was quickly cooled in the air. A fluorescent material obtained was boiled with water together with the crucible. After cooling, the fluorescent material was cleansed with 1 N-nitric acid, was washed with water and was dried.

The fluorescent material synthesized had a composition of $NaNd_{0.9}Yb_{0.1}P_4O_{12}$, and its luminescence intensity was approximately 6.4 times as high as the luminescence intensity of the neodymium-activated fluorescent material ($LiNdP_4O_{12}$).

While the foregoing examples employed Li and Na as M, similar effects were obtained when K, Rb and Cs were used. Whether these elements were used alone or in combination consisting of two or more, no difference was noted in the luminescence characteristics.

What is claimed is:

1. An infrared ray excited - infrared ray emitting fluorescent material represented by the following formula:

$MM'_{1-x-y}Nd_xYb_yP_4O_{12}$ where M denotes at least one element selected from the group consisting of Li, Na, K, Rb and Cs, and M' denotes at least one element selected from the group consisting of Sc, Y, La, Ce, Gd, Lu, Ga and In, and where $0.05 \leq x \leq 0.999$, $0.001 \leq y \leq 0.950$, and $x + y \leq 1.0$; the maximum luminescence wavelength of said fluorescent material being approximately 980 nm.

2. An infrared ray excited - infrared ray emitting fluorescent material according to claim 1, wherein the material is represented by the following formula:

$LiNd_{0.9}Yb_{0.1}P_4O_{12}$

3. An infrared ray excited - infrared ray emitting fluorescent material according to claim 1, wherein the material is represented by the following formula:

$LiBi_{0.2}Nb_{0.7}Yb_{0.1}P_4O_{12}$

4. An infrared ray excited - infrared ray emitting fluorescent material according to claim 1, wherein the material is represented by the following formula:

$NaNd_{0.9}Yb_{0.1}P_4O_{12}$

* * * * *